US009884952B2

(12) United States Patent
Ishikawa

(10) Patent No.: US 9,884,952 B2
(45) Date of Patent: Feb. 6, 2018

(54) CONVEYOR BELT RUBBER COMPOSITION AND CONVEYOR BELT

(71) Applicant: BRIDGESTONE CORPORATION, Chuo-ku, Tokyo (JP)

(72) Inventor: Tetsuya Ishikawa, Yokohama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/303,409

(22) PCT Filed: Mar. 30, 2015

(86) PCT No.: PCT/JP2015/001831
§ 371 (c)(1),
(2) Date: Oct. 11, 2016

(87) PCT Pub. No.: WO2015/159492
PCT Pub. Date: Oct. 22, 2015

(65) Prior Publication Data
US 2017/0029598 A1 Feb. 2, 2017

(30) Foreign Application Priority Data
Apr. 17, 2014 (JP) ................. 2014-085645

(51) Int. Cl.
| | | |
|---|---|---|
| *B65G 15/32* | (2006.01) | |
| *C08K 3/04* | (2006.01) | |
| *C08K 5/3415* | (2006.01) | |
| *C08L 7/00* | (2006.01) | |
| *C08L 9/00* | (2006.01) | |

(52) U.S. Cl.
CPC ............ *C08K 5/3415* (2013.01); *B65G 15/32* (2013.01); *C08K 3/04* (2013.01); *C08L 7/00* (2013.01); *C08L 9/00* (2013.01)

(58) Field of Classification Search
CPC ........ B65G 15/32; C08K 3/04; C08K 5/3415; C08L 9/00; C08L 7/00

USPC .......................................................... 524/94
See application file for complete search history.

(56) References Cited

U.S. PATENT DOCUMENTS

| | | | |
|---|---|---|---|
| 5,684,091 A | 11/1997 | Maly et al. | |
| 5,985,963 A | 11/1999 | D Sidocky et al. | |
| 6,132,870 A | 10/2000 | Halladay et al. | |
| 9,296,880 B2 * | 3/2016 | Nakano | B65G 15/32 |
| 2006/0135660 A1 | 6/2006 | Hoopes | |
| 2006/0148942 A1 | 7/2006 | D'Sidocky et al. | |
| 2011/0184109 A1 | 7/2011 | Satou | |

FOREIGN PATENT DOCUMENTS

| | | |
|---|---|---|
| CN | 1610720 A | 4/2005 |
| CN | 102177200 A | 9/2011 |
| CN | 102753613 A | 10/2012 |
| CN | 102906128 A | 1/2013 |
| CN | 105264004 A | 1/2016 |
| EP | 0823453 A1 | 2/1998 |
| EP | 2792709 A1 | 10/2014 |
| JP | S61272141 A | 12/1986 |
| JP | S627739 A | 1/1987 |
| JP | S63286445 A | 11/1988 |
| JP | S6462338 A | 3/1989 |
| JP | H06306211 A | 11/1994 |
| JP | H1077361 A | 3/1998 |
| JP | H11158323 A | 6/1999 |
| JP | H11269276 A | 10/1999 |
| JP | 2003165645 A | 6/2003 |
| JP | 2004082878 A | 3/2004 |
| JP | 2008163114 A | 7/2008 |
| JP | 2010070746 A | 4/2010 |
| JP | 2011074344 A | 4/2011 |
| WO | 03054078 A1 | 7/2003 |
| WO | 2013089069 A1 | 6/2013 |

\* cited by examiner

*Primary Examiner* — Angela C Scott
(74) *Attorney, Agent, or Firm* — Kenja IP Law PC

(57) ABSTRACT

A rubber composition with which a conveyor belt having high energy saving performance can be obtained while maintaining breaking resistance and a conveyor belt having high energy saving performance while maintaining breaking resistance are provided. A conveyor belt rubber composition includes: a diene-based polymer; and a bismaleimide compound.

18 Claims, No Drawings

CONVEYOR BELT RUBBER COMPOSITION AND CONVEYOR BELT

TECHNICAL FIELD

The disclosure relates to a conveyor belt rubber composition and a conveyor belt.

BACKGROUND

Transportation devices including conveyor belts are widely used as item transportation means in various industrial fields such as steel, coal, and cement. As larger transportation volumes and longer transportation paths are required in recent years, there is strong demand to reduce power consumption (save energy) in such transportation devices. A conveyor belt is typically composed of lower cover rubber, a reinforcing member made of steel cords or the like, and upper cover rubber. Of these members, the lower cover rubber has particularly significant influence on energy saving performance as it comes into contact with a driving pulley, a driven pulley, a shape retaining roller, etc.

Meanwhile, it is also important for the conveyor belt to have basic mechanical properties such as breaking resistance as a transportation device member, for stable operation and long life.

In view of the above, the rubber composition used in a rubber member such as the lower cover rubber needs to be improved to provide such a conveyor belt that contributes to lower power consumption of the transportation device without impairing basic mechanical properties such as breaking resistance as a transportation device member (Patent Literature (PTL) 1).

CITATION LIST

Patent Literature

PTL 1: JP 2011-74344 A

SUMMARY

Technical Problem

It could be helpful to provide a rubber composition with which a conveyor belt having high energy saving performance can be obtained while maintaining breaking resistance, and a conveyor belt having high energy saving performance while maintaining breaking resistance.

Solution to Problem

A conveyor belt rubber composition according to the disclosure includes: a diene-based polymer; and a bismaleimide compound.

A conveyor belt according to the disclosure uses the conveyor belt rubber composition described above.

Advantageous Effect

It is thus possible to provide a rubber composition with which a conveyor belt having high energy saving performance can be obtained while maintaining breaking resistance, and a conveyor belt having high energy saving performance while maintaining breaking resistance.

DETAILED DESCRIPTION

The following describes one of the disclosed embodiments in detail.

A conveyor belt rubber composition according to the disclosure includes a diene-based polymer and a bismaleimide compound.

(Rubber Component)

The conveyor belt rubber composition includes a diene-based polymer as a rubber component, and thus maintains basic breaking resistance. In the disclosure, "diene-based polymer" means natural rubber or synthetic rubber with the proportion of the diene-based monomer-derived unit in the constituent monomer units being more than 5 mol %. Examples of the diene-based monomer include 1,3-butadiene, isoprene, 1,3-pentadiene, and 2,3-dimethylbutadiene. Examples of a monomer other than the diene-based monomer (non-diene based monomer) include ethylene, propylene, and isobutene. Examples of the diene-based polymer include natural rubber, butadiene rubber, styrene-butadiene rubber, isoprene rubber, chloroprene rubber, ethylene-propylene-diene copolymer, and acrylonitrile-butadiene rubber. These may be used singly or in combination of two or more types. The conveyor belt rubber composition preferably includes at least natural rubber and butadiene rubber and more preferably includes only natural rubber and butadiene rubber as the diene-based polymer, in order to maintain the breaking resistance of the conveyor belt favorably.

In the case where the conveyor belt rubber composition includes natural rubber and butadiene rubber as the diene-based polymer, the ratio of the content of the natural rubber to the content of the butadiene rubber ((the content of the natural rubber)/(the content of the butadiene rubber)) is preferably 30/70 to 70/30, more preferably 35/65 to 65/35, and particularly preferably 40/60 to 60/40 in mass ratio. When the mass ratio is 30/70 or more, mechanical properties such as flex cracking resistance can be maintained favorably. When the mass ratio is 70/30 or less, mechanical properties such as wear resistance can be maintained favorably.

The conveyor belt rubber composition may include, as the rubber component, a non-diene based polymer (a polymer other than the diene-based polymer) in addition to the diene-based polymer. The content of the diene-based polymer in the rubber composition is preferably more than 50 mass %, more preferably more than 80 mass %, and most preferably 100 mass % with respect to the total content of the diene-based polymer and the non-diene based polymer.

(Bismaleimide Compound)

The conveyor belt rubber composition includes a bismaleimide compound. The bismaleimide compound is a compound expressed by the following Formula (3)

[Chem. 1]

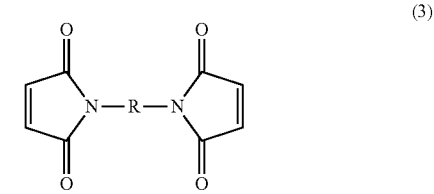

(3)

or its derivative, where R is a divalent group. The bismaleimide compound is capable of functioning as a crosslinking agent in the rubber composition and, when contained in the rubber composition that contains the diene-based polymer, influences the crosslinking density in the rubber after crosslinking. Such influence is expected to contribute to improved loss property of the rubber composition, and improved energy saving performance of the conveyor belt.

The bismaleimide compound is not particularly limited, and may be selected as appropriate depending on purpose. To further improve the energy saving performance of the conveyor belt, a compound expressed by the following Formula (1) or (2)

[Chem. 2]

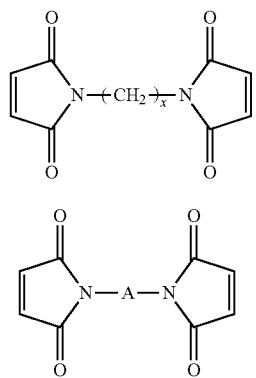

may be suitably used, where X is an integer of 1 to 20, and A is an aromatic group having 6 to 24 carbon atoms.

Examples of the bismaleimide compound expressed by Formula (1) include 1,2-bismaleimideethane, 1,4-bismaleimidebutane, and 1,6-bismaleimidehexane. Examples of the bismaleimide compound expressed by Formula (2) include N,N'-1,2-phenylenebismaleimide, N,N'-1,3-phenylenebismaleimide, N,N'-1,4-phenylenebismaleimide, N,N'-(4,4'-diphenylmethane)bismaleimide, and bis(3-ethyl-5-methyl-4-maleimidephenyl)methane. Of these, N,N'-1,3-phenylenebismaleimide is particularly preferable.

These may be used singly or in combination of two or more types as the bismaleimide compound.

The content of the bismaleimide compound in the conveyor belt rubber composition is not particularly limited, and may be selected as appropriate depending on purpose. The content of the bismaleimide compound is preferably 0.3 parts to 1.5 parts by mass, more preferably 0.5 parts to 1.0 parts by mass, and particularly preferably 0.6 parts to 0.8 parts by mass with respect to 100 parts by mass the rubber component. When the content of the bismaleimide compound is 0.3 parts by mass or more with respect to 100 parts by mass the rubber component, the energy saving performance of the conveyor belt can be improved sufficiently. When the content of the bismaleimide compound is 1.5 parts by mass or less with respect to 100 parts by mass the rubber component, the breaking resistance of the conveyor belt can be maintained sufficiently favorably.

(Carbon Black)

The conveyor belt rubber composition may include carbon black as a reinforcing filler, in addition to the aforementioned components. The inclusion of the carbon black in the conveyor belt rubber composition improves the breaking resistance of the conveyor belt. Examples of the carbon black include grades of carbon black such as SAF-HS, SAF, ISAF-HS, ISAF, ISAF-LS, N285, N339, HAF-HS, HAF, and HAF-LS. Of these, a combination of ISAF-grade carbon black and HAF-grade carbon black is preferable in order to further improve the breaking resistance of the conveyor belt.

ISAF-grade carbon black is carbon black having a nitrogen adsorption specific surface area ($N_2SA$) in the range of 100 $m^2/g$ or more and 120 $m^2/g$ or less. HAF-grade carbon black is carbon black having a nitrogen adsorption specific surface area (NSA) in the range of 70 $m^2/g$ or more and less than 100 $m^2/g$.

The content of the carbon black in the conveyor belt rubber composition is not particularly limited, and may be selected as appropriate depending on purpose. The content of the carbon black is preferably 10 parts to 60 parts by mass, more preferably 20 parts to 50 parts by mass, and particularly preferably 35 parts to 45 parts by mass with respect to 100 parts by mass the diene-based polymer. When the content of the carbon black is in the aforementioned range with respect to 100 parts by mass the diene-based polymer, favorable breaking resistance can be maintained without degrading the energy saving performance of the conveyor belt and the handleability when preparing the rubber composition.

In the case where the conveyor belt rubber composition includes ISAF-grade carbon black and HAF-grade carbon black, the content ratio of the two types of carbon black is not particularly limited, and may be selected as appropriate depending on purpose. The ratio of the content of the ISAF-grade carbon black to the content of the HAF-grade carbon black ((the content of the ISAF-grade carbon black)/(the content of the HAF-grade carbon black)) is preferably 25/75 to 75/25 and more preferably 25/75 to 50/50 in mass ratio. When the mass ratio is 25/75 or more, the breaking resistance of the conveyor belt is sufficient. When the mass ratio is 75/25 or less, the energy saving performance of the conveyor belt is further improved.

(Other Components)

The rubber composition may further include additives, etc. other than the aforementioned components as appropriate. Examples of the additives, etc. include vulcanizing agents such as sulfur, vulcanization accelerators, vulcanization acceleration aids such as zinc oxide, retarders (anti-scorch agents), reinforcing fillers other than carbon black, age resistors, plasticizers, petroleum resins, waxes, antioxidants, oils, lubricants, ultraviolet absorbing agents, dispersants, compatibilizing agents, and homogenizing agents.

(Conveyor Belt Rubber Composition)

The conveyor belt rubber composition may be, for example, obtained by kneading the aforementioned components using a kneader such as an open-type mixing roll or an internal-type Banbury mixer, Brabender mixer, or kneader.

(Conveyor Belt)

A conveyor belt according to the disclosure uses the conveyor belt rubber composition described above. In one embodiment, the conveyor belt rubber composition is preferably used in at least inner-circumferential surface layer rubber (lower cover rubber) of the conveyor belt which is below a reinforcing member made of steel cords or the like and comes into contact with a driving pulley, a driven pulley, a shape retaining roller, etc., in order to improve energy saving performance. The conveyor belt rubber composition may also be used in outer-circumferential surface layer rubber (upper cover rubber) which is above the reinforcing member and comes into contact with an item being transported. The conveyor belt using the conveyor belt rubber composition has high energy saving performance while maintaining breaking resistance, and therefore contributes to lower power consumption of the transportation device.

As a specific example of manufacturing the conveyor belt, the reinforcing member is sandwiched between sheets made of the rubber composition, and the rubber composition is heated to pressure-bond and vulcanization-adhere to the reinforcing member so as to coat the reinforcing member. The vulcanization condition in such a case may be selected as appropriate. A preferable condition is typically 140° C. to 180° C. and 10 minutes to 80 minutes.

A transportation device can be manufactured using the conveyor belt according to the disclosure. Such a transportation device has high energy saving performance because the conveyor belt according to the disclosure is used. Although the conveyor belt is applicable to any transportation device, the conveyor belt is especially suitable for a long-distance transportation device in which, for example, the total length of the load conveyance portion is 1.0 km or more.

EXAMPLES

Examples are described below. The disclosure is, however, not limited to the following examples, and may be changed as appropriate without departing from the scope of the disclosure.

Each unvulcanized rubber composition (unit: parts by mass) shown in Table 1 was prepared using a 1700 ml Banbury mixer, and vulcanized at 160° C. for 15 minutes to form a vulcanized rubber composition. The breaking resistance and energy saving performance of each vulcanized rubber composition were evaluated according to the following methods. The results are shown in Table 1.

In Table 1, the value in the parentheses in each of the "ISAF-CB" and "HAF-CB" fields represents the relative content of ISAF-grade carbon black or HAF-grade carbon black with the total content of ISAF-grade carbon black and HAF-grade carbon black being set to 100 parts by mass.

(Breaking Resistance)

Tensile strength Tb (MPa) was measured according to JIS K6251. A larger value indicates higher breaking resistance.

(Energy Saving Performance)

tan $\delta$ (loss tangent) and E' (dynamic storage modulus) were measured at a frequency of 10 Hz, a measurement temperature of 20° C., and a strain of 2.0%, using a spectrometer made by Toyo Seiki Co., Ltd. as a viscoelasticity meter. tan $\delta/E'^{(1/3)}$ was calculated from the measurements, and a loss index was determined with the calculated tan $\delta/E'^{(1/3)}$ of Comparative Example 1 being set to 100. A smaller value indicates higher energy saving performance.

TABLE 1

| | Ex | | | | | | | | | | | | | | | | Comp. Ex |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 1 |
| Natural rubber | 30 | 30 | 30 | 30 | 30 | 30 | 20 | 30 | 60 | 70 | 60 | 30 | 30 | 100 | 30 | 30 | 100 |
| Butadiene rubber*1 | 70 | 70 | 70 | 70 | 70 | 70 | 80 | 70 | 40 | 30 | 40 | 70 | 70 | 0 | 70 | 70 | 0 |
| ISAF-CB*2 | 20 | 20 | 20 | 20 | 10 | 10 | 10 | 30 | 20 | 20 | 20 | 20 | 20 | 20 | 20 | 20 | 20 |
| | (50) | (50) | (50) | (25) | (25) | (25) | (75) | (50) | (50) | (50) | (50) | (50) | (50) | (50) | (50) | (50) | (50) |
| HAF-CB*3 | 20 | 20 | 20 | 20 | 30 | 30 | 30 | 10 | 20 | 20 | 20 | 20 | 20 | 20 | 20 | 20 | 20 |
| | (50) | (50) | (50) | (75) | (75) | (75) | (25) | (50) | (50) | (50) | (50) | (50) | (50) | (50) | (50) | (50) | (50) |
| Vulcanization acceleration aid A*4 | 3 | 3 | 3 | 3 | 3 | 3 | 3 | 3 | 3 | 3 | 3 | 3 | 3 | 3 | 3 | 3 | 3 |
| Vulcanization acceleration aid B*5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 |
| Age resistor *6 | 3 | 3 | 3 | 3 | 3 | 3 | 3 | 3 | 3 | 3 | 3 | 3 | 3 | 3 | 3 | 3 | 3 |
| Vulcanizing agent*7 | 2 | 2 | 2 | 2 | 2 | 2 | 2 | 2 | 2 | 2 | 2 | 2 | 2 | 2 | 2 | 2 | 2 |
| Bismaleimide compound A*8 | 0.6 | 0 | 0.8 | 1.0 | 0.6 | 1.0 | 0.6 | 0.6 | 0.6 | 0.6 | 1.0 | 0.3 | 0.1 | 1.0 | 1.5 | 2.0 | 0 |
| Bismaleimide compound B*9 | 0 | 0.6 | 0 | 0 | 0 | 0 | 0 | 0 | 0 | 0 | 0 | 0 | 0 | 0 | 0 | 0 | 0 |
| Vulcanization accelerator*10 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| Tensile strength Tb (MPa) | 18.3 | 18.5 | 18.5 | 18.3 | 18.1 | 18.2 | 18.2 | 16.8 | 19.0 | 19.2 | 19.1 | 18.2 | 18.2 | 20.0 | 18.0 | 15.0 | 20.5 |
| Loss Index | 74 | 75 | 69 | 65 | 71 | 63 | 71 | 77 | 77 | 80 | 66 | 80 | 84 | 86 | 59 | 59 | 100 |

*1butadiene rubber: "T0700" made by JSR Corporation

*2ISAF-grade carbon black: "N220" made by Cabot Corporation

*3HAF-grade carbon black: "N330TV" made by Cabot Corporation

*4vulcanization acceleration aid A: stearic acid, "Stearic Acid 50S" made by New Japan Chemical Co., Ltd.

*5vulcanization acceleration aid B: zinc oxide, "Ginrei SR" made by Toho Zinc Co., Ltd.

*6age resistor: "NONFLEX RD" made by Seiko-Chemical Co., Ltd.

*7vulcanizing agent: sulfur, "60% Insoluble Sulfur" made by Nippon Kanryu Industry Co., Ltd.

*8bismaleimide compound A: N,N'-1,3-phenylenebismaleimide, "VULNOC PM" made by Changzhou Xinxing Huadaming Chemical Industrial Co., Ltd.

*9bismaleimide compound B: N,N'-(4,4'-diphenylmethane)bismaleimide, "BMI-RB" made by Daiwa Kasei Co., Ltd.

*10vulcanization accelerator: "NOCCELER NS-F" made by Ouchi Shinko Chemical Industrial Co., Ltd.

The results shown in Table 1 demonstrate that a conveyor belt having high energy saving performance while maintaining breaking resistance can be obtained by using a rubber composition including a diene-based polymer and a bismaleimide compound.

The invention claimed is:

1. A conveyor belt rubber composition comprising:
   a diene-based polymer;
   a bismaleimide compound; and
   carbon black including ISAF-grade carbon black and HAF-grade carbon black,
   wherein a ratio of content of the ISAF-grade carbon black to content of the HAF-grade carbon black, expressed as (the content of the ISAF-grade carbon black)/(the content of the HAF-grade carbon black), is 25/75 to 75/25 in mass ratio.

2. The conveyor belt rubber composition according to claim 1,
   wherein content of the bismaleimide compound is 0.3 parts to 1.5 parts by mass with respect to 100 parts by mass a rubber component.

3. The conveyor belt rubber composition according to claim 2,
   wherein content of the bismaleimide compound is 0.5 parts to 1.0 parts by mass with respect to 100 parts by mass a rubber component.

4. The conveyor belt rubber composition according to claim 3,
   wherein content of the bismaleimide compound is 0.6 parts to 0.8 parts by mass with respect to 100 parts by mass a rubber component.

5. The conveyor belt rubber composition according to claim 1,
   wherein the diene-based polymer includes natural rubber and butadiene rubber, and
   a ratio of content of the natural rubber to content of the butadiene rubber, expressed as (the content of the natural rubber)/(the content of the butadiene rubber), is 30/70 to 70/30 in mass ratio.

6. The conveyor belt rubber composition according to claim 5,
   wherein the ratio of content of the natural rubber to content of the butadiene rubber is 35/65 to 65/35 in mass ratio.

7. The conveyor belt rubber composition according to claim 6,
   wherein the ratio of content of the natural rubber to content of the butadiene rubber is 40/60 to 60/40 in mass ratio.

8. The conveyor belt rubber composition according to claim 1,
   wherein the bismaleimide compound is a compound expressed by the following Formula (1) or (2)

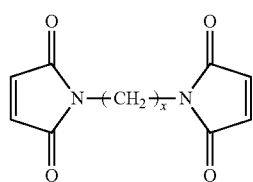 (1)

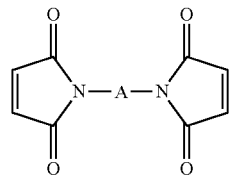 (2)

where X is an integer of 1 to 20, and A is an aromatic group having 6 to 24 carbon atoms.

9. The conveyor belt rubber composition according to claim 1,
   wherein the bismaleimide compound is a compound expressed by the following Formula (2)

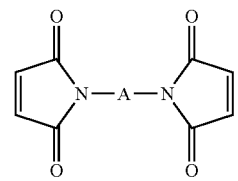 (2)

where A is an aromatic group having 6 to 24 carbon atoms.

10. The conveyor belt rubber composition according to claim 1,
    wherein the diene-based polymer includes only natural rubber and butadiene rubber, and
    the conveyor belt rubber composition does not comprise any polymers other than the diene-based polymer.

11. The conveyor belt rubber composition according to claim 1,
    wherein the bismaleimide compound is N,N'-1,3-phenylenebismaleimide or N,N'-(4,4'-diphenylmethane)bismaleimide.

12. The conveyor belt rubber composition according to claim 11,
    wherein the bismaleimide compound is N,N'-1,3-phenylenebismaleimide.

13. The conveyor belt rubber composition according to claim 11,
    wherein the bismaleimide compound is N,N'-(4,4'-diphenylmethane)bismaleimide.

14. The conveyor belt rubber composition according to claim 1,
    wherein content of the carbon black is 10 parts to 60 parts by mass with respect to 100 parts by mass the diene-based polymer.

15. The conveyor belt rubber composition according to claim 14,
    wherein content of the carbon black is 20 parts to 50 parts by mass with respect to 100 parts by mass the diene-based polymer.

16. The conveyor belt rubber composition according to claim 15,
    wherein content of the carbon black is 35 parts to 45 parts by mass with respect to 100 parts by mass the diene-based polymer.

17. The conveyor belt rubber composition according to claim 1,
   wherein a ratio of content of the ISAF-grade carbon black to content of the HAF-grade carbon black is 25/75 to 50/50 in mass ratio.

18. A conveyor belt comprising the conveyor belt rubber composition according to claim 1.

* * * * *